(12) United States Patent
Bonicontro

(10) Patent No.: US 6,286,540 B1
(45) Date of Patent: Sep. 11, 2001

(54) PIG OR SPHERE THROWER

(76) Inventor: Nataniel Carli Bonicontro, Rua Padre João Barbiere, 216 ap 601, Jandaia do Sul (BR)

( * ) Notice: Subject to any disclaimer, the term of this patent is extended or adjusted under 35 U.S.C. 154(b) by 0 days.

(21) Appl. No.: 09/346,893

(22) Filed: Jul. 2, 1999

(30) Foreign Application Priority Data

Apr. 14, 1998 (BR) .................................................... 9801233

(51) Int. Cl.[7] .................................................. B08B 9/04
(52) U.S. Cl. ..................................... 137/268; 15/104.062
(58) Field of Search ....................... 137/268; 15/104.062, 15/3.5, 104.05

(56) References Cited

U.S. PATENT DOCUMENTS 3,266,077 * 8/1966 Elliott et al. ...................... 137/268 X
3,779,270 * 12/1973 Davis ................................... 137/268
4,793,016 * 12/1988 Valentine et al. ................ 137/268 X

* cited by examiner

Primary Examiner—Kevin Lee
(74) Attorney, Agent, or Firm—Hughes Hubbard & Reed LLP; Ronald Abramson; Peter A. Sullivan

(57) ABSTRACT

A pipe system introduces an element launcher, which may be a pig, a foam-pig, an inflatable sphere, or a foam sphere, by mechanically displacing the element into the piping system.

5 Claims, 1 Drawing Sheet

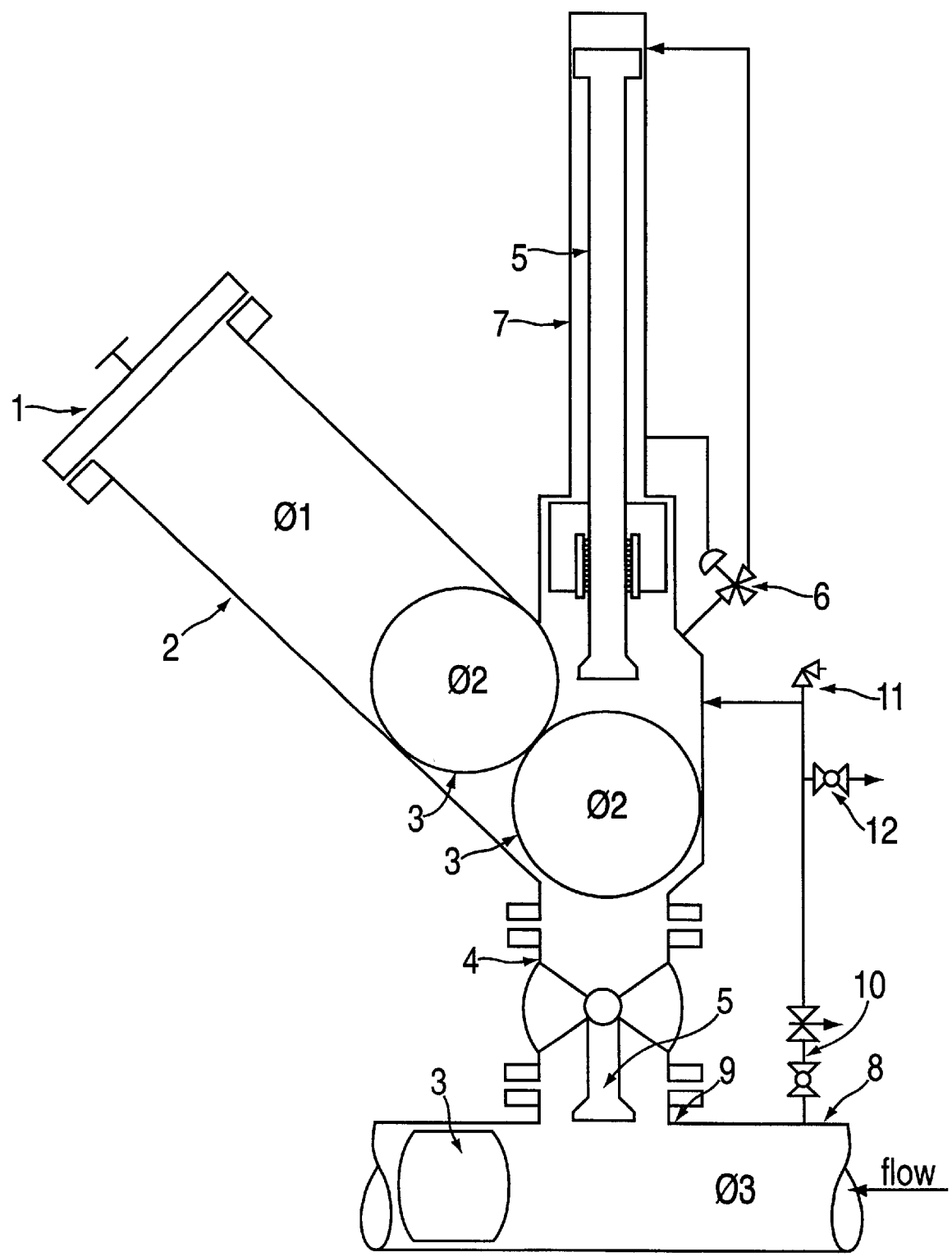
Figure

PIG OR SPHERE THROWER

This invention refers to an NC-SR device which can be used in fluid transportation and displacement systems inside a piping system.

BACKGROUND OF THE INVENTION

The device now used for the introduction of scrapers into piping systems, known as a thrower, has its principle of operation based on switching the flow of the pipe-line fluid to a chamber, where the scraper (which may be a pig, a foam-pig, an inflatable sphere or a foam-sphere has been introduced previously. The fluid flow passing through the chamber displaces the scraper from the chamber to the piping system. The devices now used present some operational problems:

- The need of using three valves to attain this interconnection;
- The impossibility of introducing a foam-pig or sphere into the existing piping system through a connection;
- Difficulties of automation for throwing spheres, due to the large number of valves and mechanical devices involved;
- Throwing of the foam-pigs or spheres manually;
- Risks of operational procedures;
- The great danger of accidents in constantly opening the throw chamber.

SUMMARY OF THE INVENTION

The principle of operation of the NC-SR thrower is by mechanical displacement of the scraper, which was previously introduced into the piping system chamber.

The advantages of the NC-SR thrower include:

- Lower installation cost. Only a valve is necessary for interconnection with the piping system;
- Less space needed for installation;
- Introduction of the foam-pig or sphere into the existing piping system through the connection (valves) becomes possible;
- Automation for throwing foam -spheres and foam-pigs becomes possible.
- A less aggressive environment and less danger of accidents, because the opening of the chamber of the NC-SR thrower occurs frequently;
- Lower operational and maintenance cost, since wear due to operation of the valves is less frequent, as well as the number of valves;
- Less danger of operational mistakes in throwing operations;
- No need for special chamber covers, because of the lower frequency of chamber openings of the NC-SR thrower.

BRIEF DESCRIPTION OF THE DRAWING

The Figure is a schematic illustration of an embodiment of the present invention.

DETAILED DESCRIPTION OF THE DRAWING

The blocking valve (4) is closed. Depressurizing valve (12) is open and pressure equalizer is closed (10). The sequence of operation is as follows:

1. Open the cover (1), introduce the spheres (3) into the chamber (2) and close it again. Close the depressurizing valve (12).
2. Open the pressure equalizer (10) and then open the blocking valve (4).
3. Activate the three-way valve (6), this will cause the actuator (7) to move the dislocator (5), which will push the pig or sphere (3) into the piping system. When the position of the dislocator reaches the piping system, there will be pressurization of the actuator of the three-way valve (6) and the actuator (7) will move the dislocator into its original position.
4. Repeat item 3 until there are no more spheres. When this happens, close the blocking valve (4) and the pressure equalizer (10), open the depressurizing valve (12) and begin the operation anew from item (1).

In order for the pig or sphere thrower, which is the purpose of this patent, be clearly to understood and operated by any specialist in this technological field, the invention shall be described in a clear, brief and objective way based on the Figure of the proposed invention, whose basic model is being presented in an illustrated way.

The present model however must not be considered as a restriction to its form, since other forms or variances may be considered, with changes or conceptions keeping the same functional features. The Figure is a schematic view of the pig or sphere thrower. The invention comprises an admittance cover (1) which gives access to a chamber (2), where a set of pigs or spheres (3) can be introduced, such chamber (2) being connected to a blocking valve or piping system connection (4), having at its upper part (2) a pneumatic or hydraulic actuator (7), and in its internal part a dislocator (5); there also is a three way valve (6), self-operated with manual or remote setting- valves for pressure equalizer (10), safety valves (11), depressurizing valves (12), while the blocking valve (4) is connectd to piping system (8) by means of a connection "Y" or "T" (9).

It can be seen that the pig or sphere thrower NC-SR optimizes the transportation and moving operation of fluids through a piping system, by means of a device of great safety and reduced cost, deserving the legal protection here claimed.

What is claimed is:

1. An apparatus for inserting at least one element into a piping system comprising:

a chamber, said chamber holding said at least one element;

a dislocator, said dislocator physically contacting said at least one element in said chamber to push said at least one element from said chamber into said piping system;

a blocking valve to connect said chamber to said piping system; and a means for regulating pressure between said chamber and said piping system.

2. The apparatus of claim 1 wherein said dislocator is hydraulically driven by pressure from a fluid contained in said piping system.

3. The apparatus of claim 1 wherein said dislocator is electrically driven.

4. The apparatus of claim 1 wherein said at least one element is a pig or a sphere.

5. The apparatus of claim 1 wherein said means for regulating said pressure comprises a three way valve, a depressurizing valve, a pressure equalizer and a blocking valve.

* * * * *